Apr. 17, 1923.

R. F. SCOTT

DRILL SPINDLE ADJUSTING MECHANISM

Filed Sept. 14, 1921

1,452,172

Inventor:
Robert F. Scott,
By Butler & Denny
Attorneys.

Patented Apr. 17, 1923.

1,452,172

UNITED STATES PATENT OFFICE.

ROBERT F. SCOTT, OF PHILADELPHIA, PENNSYLVANIA, ASSIGNOR TO EDWIN HARRINGTON, SON & COMPANY, INC., OF PHILADELPHIA, PENNSYLVANIA, A CORPORATION OF PENNSYLVANIA.

DRILL-SPINDLE-ADJUSTING MECHANISM.

Application filed September 14, 1921. Serial No. 500,578.

*To all whom it may concern:*

Be it known that I, ROBERT F. SCOTT, a citizen of the United States, residing at Philadelphia, in the county of Philadelphia and State of Pennsylvania, have invented certain Improved Drill-Spindle-Adjusting Mechanism, of which the following is a specification.

This invention is designed to provide improved mechanism for adjusting the relation between drilling spindles and their bearings, when required by wear, particularly in constructions adapted for use in multiple spindle drills. The improvements effect and maintain, accurately and securely, a slight or fine adjustment, by which proper compensation can be made for very slight wear and the parts kept at all times in proper working relation.

Figure 1:
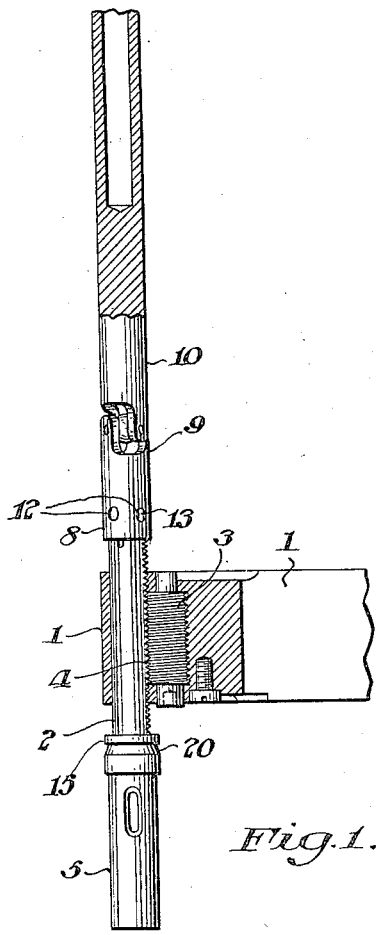
Figure 2:
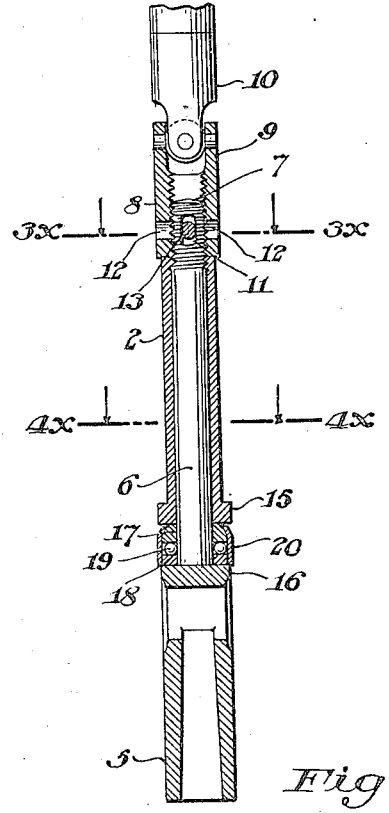
Figure 3:
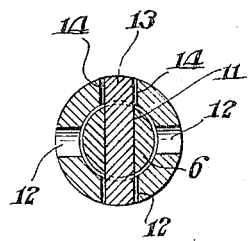
Figure 4:
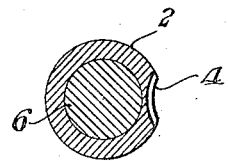

In the accompanying drawings, Fig. 1 is a broken part sectional side elevation of a drill spindle together with bearing and feeding means, constructed in accordance with my invention; Fig. 2 is a broken longitudinal sectional view in illustration of a detached spindle with associated parts embodying the invention; Fig. 3 is an enlarged sectional view taken on the line 3×—3× of Fig. 2; and Fig. 4 is an enlarged sectional view taken on the line 4×—4× of Fig. 2.

The mechanism shown in the drawings comprises a bearing 1, as a multiple spindle radius bar, in which is disposed a longitudinally movable bushing or journal bearing 2, the bearing 1 having therein the journalled adjusting screw 3 (parallel to the bushing) which engages the screw threads 4 cut in the periphery of the bushing longitudinally thereof to conform with the threads of the screw 3.

The spindle 5 for holding the tool has a stem 6 which extends through and is journalled in the bushing 2, the upper end of the stem having thereon a fine screw thread 7 which is adapted to be fed in an interiorly threaded tubular body 8 of the universal joint knuckle 9, the latter being connected with and operated by the universal joint knuckle 10 in a usual manner.

The spindle 6 is provided with a longitudinal slot 11 extending transversely through its axis and its threaded upper end, from side to side, and the part 8 is provided with the holes 12 extending therethrough transversely to the axis thereof, in quadrantal relation, so that the axes of the holes shall lie in a plane transverse to the axis of the spindle and passing through the slot 11 in various longitudinal positions, the slot being substantially longer and of less width than the diameters of the holes.

A taper-pin 13, having parallel flattened sides 14, passes through opposite holes 12 and the slot 11 in registration therewith, the flattened sides of the pin engaging the sides of the slot to provide a fairly broad surface bearing for transmitting the force through the coupling to the spindle in the driving operation.

A bearing 15 at the bottom of the bushing 2 and a bearing 16 at the bottom of the spindle 6 engage the respective rings 17 and 18, between which are disposed the balls 19, forming therewith an anti-friction bearing, the rings and balls being encased by a jacket 20.

It will now be understood that in this construction the several parts connecting the chuck 5 with the driving member 10 can be finely adjusted and firmly secured in the adjusted relation by this mechanism. If, for instance, the screw threads 7 are cut 32 to the inch and the spindle 6 is turned through a quarter of a revolution, a longitudinal adjustment of 1/128th of an inch is effected. This adjustment is held by driving the pin 13 through the registered openings 11 and 12, the opening 11 being of such length that it will register fully with the holes 12 for the passage of the pin 13 throughout the necessary range of adjustment, the pin holding the parts 6 and 8 against relative turning movement, and the threads preventing relative longitudinal movement.

Having described my invention, I claim:—

1. A drill spindle adjusting mechanism comprising a bearing, in combination with a spindle journalled therein, and means for revolving said spindle in said bearing, said spindle having a threaded end provided with a hole extending transversely therethrough, said means provided with an interiorly threaded member engaging said threaded spindle end and having a hole adapted to register with said hole first named, one of said holes having the form of a slot extending in the direction of the axis of said bearing, and a pin adapted to pass through said slot and holes aforesaid for fixing said spindle to said member.

2. A drill spindle adjusting mechanism comprising the combination with a bearing and a spindle journalled therein, said spindle provided with a threaded end having therethrough a slot extending longitudinally thereof, of an internally threaded member adapted for engaging said threaded end and said bearing, said member having holes therein adapted to register with said slot in different relations of said spindle and member, and a pin adapted to pass through said holes and slot.

3. A drill spindle adjusting mechanism comprising the combination with a bearing, a bushing in said bearing and means for feeding said bushing longitudinally in said bearing, of a drill chuck spindle journalled in said bearing, said spindle having a threaded end with a slot extending therethrough, an internally threaded member adapted for engaging said threaded end and said bushing, said member having holes therein adapted to register with said slot in different longitudinal relations of said spindle to said member, and a pin adapted to pass through said holes and slot.

Signed at Philadelphia, in the county of Philadelphia and State of Pennsylvania, this 12th day of September, 1921.

ROBT. F. SCOTT.